United States Patent
Hu et al.

(10) Patent No.: US 8,250,188 B2
(45) Date of Patent: Aug. 21, 2012

(54) METHOD AND DEVICE FOR RESTORING AT LEAST ONE SETTING

(75) Inventors: Jian Qiang Hu, Beijing (CN); Jian Jun Wang, Beijing (CN); Ya Fei Shao, Beijing (CN)

(73) Assignee: Thomson Licensing, Issy Moulineaux (FR)

(*) Notice: Subject to any disclaimer, the term of this patent is extended or adjusted under 35 U.S.C. 154(b) by 47 days.

(21) Appl. No.: 12/735,249

(22) PCT Filed: Dec. 22, 2008

(86) PCT No.: PCT/EP2008/068183
§ 371 (c)(1),
(2), (4) Date: Jun. 25, 2010

(87) PCT Pub. No.: WO2009/083543
PCT Pub. Date: Jul. 9, 2009

(65) Prior Publication Data
US 2010/0287265 A1    Nov. 11, 2010

(30) Foreign Application Priority Data
Dec. 27, 2007 (EP) .................................. 07301748

(51) Int. Cl.
*G06F 15/177* (2006.01)

(52) U.S. Cl. ......................................................... 709/221
(58) Field of Classification Search .................... None
See application file for complete search history.

(56) References Cited

U.S. PATENT DOCUMENTS

| | | | |
|---|---|---|---|
| 2002/0059631 A1 | 5/2002 | Lee | |
| 2003/0083533 A1* | 5/2003 | Gerba et al. | 585/367 |
| 2004/0117609 A1* | 6/2004 | Stalker et al. | 713/2 |
| 2005/0210525 A1 | 9/2005 | Carle et al. | |
| 2007/0050836 A1 | 3/2007 | Stanek et al. | |
| 2007/0088952 A1* | 4/2007 | Hewitt et al. | 713/171 |

FOREIGN PATENT DOCUMENTS

| | | |
|---|---|---|
| EP | 1298923 | 4/2003 |
| EP | 1624692 | 2/2006 |

* cited by examiner

*Primary Examiner* — Moustafa M Meky
*Assistant Examiner* — Clayton R Williams
(74) *Attorney, Agent, or Firm* — Tutunjian & Bitetto, P.C.

(57) ABSTRACT

A method and devices for restoring at least one setting are provided, the client device receives a code generated by a management device based on a time value and a parameter value that uniquely identifies the client device; the client device determines whether the code is valid; and if the code is valid the client device restores the at least one setting of the client device. It provides a convenient way to restore at least one setting of a client device.

9 Claims, 3 Drawing Sheets

US 8,250,188 B2

METHOD AND DEVICE FOR RESTORING AT LEAST ONE SETTING

This application claims the benefit, under 35 U.S.C. §365 of International Application PCT/EP2008/068183, filed Dec. 22, 2008, which was published in accordance with PCT Article 21(2) on Jul. 9, 2009 in English and which claims the benefit of European patent application No. 07301748.5, filed Dec. 27, 2007.

TECHNICAL FIELD

The present invention relates to configuration, and more particularly, relates to restoring at least one setting.

BACKGROUND

The PIN code of the set top box (STB) is used by the user to access some critical configurations. However, the user may forget or lose the PIN code sometimes. At present, a hard code number combination is used as a solution. Generally, the hard code number is a kind of universal code to access the critical configurations of the STB. When the PIN code is lost, the operator will send an engineer to restore the default configuration, which is also called factory configuration, by using the hard code number combination in the user's home, and then reset the PIN code for the user.

However, the solution is not convenient to some extent, firstly, the hard code number combination is hard coded, namely, all STBs' hard code number combinations are the same; secondly, the operator needs to send an engineer to user's home, and so it will cause some travel costs.

SUMMARY

According to an aspect of the present invention, a method for restoring at least one setting of a client device is provided, the client device comprises a parameter value that uniquely identifies the client device, it comprises the following steps, receiving by the client device a code generated by a management device based on a time value and the parameter value; determining by the client device whether the code is valid based on a predefined period of time, the parameter value and the current time value; and restoring the at least one setting of the client device if the code is valid.

According to an aspect of the present invention, a client device for restoring at least one setting is provided. The client device comprises a second receiving module 401; a second time module 402 that is configured to provide the time value; a restoring module 405 that is configured to retrieve and restore the at least one setting of the client device; and a determining module 403 that is configured to determine the validity of a code received by the second receiving module 401 based on a time value derived from the second time module 402, a parameter value uniquely identifying the client device, and a predefined period of time, and also configured to invoke the restoring module 405 if determining the code is valid.

According to an aspect of the present invention, a management device for restoring at least one setting of a client device is provided. The management device comprises a first receiving module 301; a first time module 302 that is configured to provide the time value; and a generation module 303 that is configured to generate a code based on a time value derived from the first time module 302 and a parameter value, which uniquely identifies the client device and is received by the first receiving module 301, wherein the code is valid for the client device to restore the at least one setting in a predefined period of time.

According to an aspect of the present invention, a code for restoring at least one setting of a client device is provided. The code, which is valid for the client device to restore the at least one setting in a predefined period of time, is generated based on a time value and a parameter value uniquely identifying the client device, wherein, the time value determines the start time of the predefined period of time According to an aspect of the present invention, it provides a convenient method to restore at least one setting, i.e. the factory configuration, of a client device so that it is needless to send an engineer to user's home anymore. By using the parameter value, it makes the code merely valid for the corresponding client device; furthermore, the code is just valid in a predefined period of time so that it is convenient for the operator to manage the code which could be used to access critical configurations. Other features and advantages will become apparent from the following detailed description of embodiment in accordance with the invention with reference to the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention together with the description which serves to explain the principle of the invention. Therefore, the invention is not limited to the embodiments. In the drawings.

DETAILED DESCRIPTION

Figure 1:
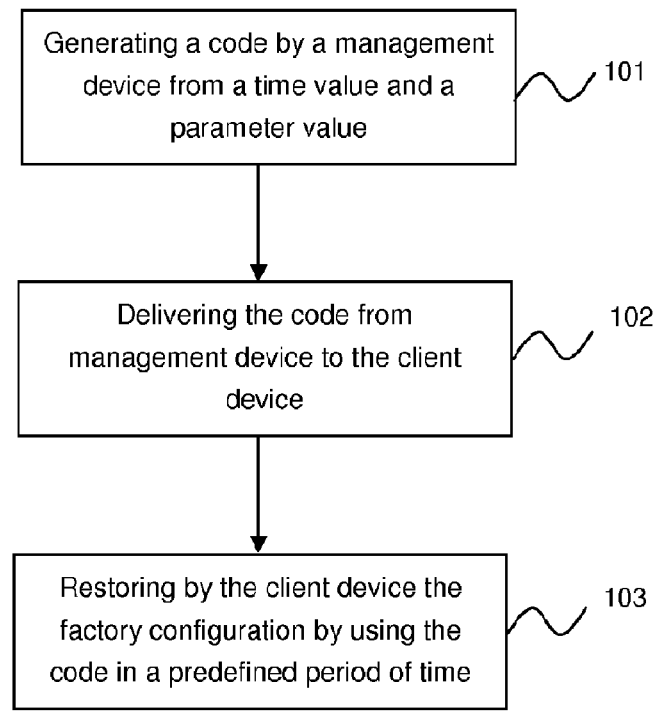
FIG. 1 is a flowchart of a general method for restoring the factory configuration in accordance with one embodiment.

One embodiment of the present invention provides a method for restoring the factory configuration of a client device, such as STB. As can be seen from FIG. 1, in step 101, a code is generated by a management device, which usually resides in operator's side, from a time value and a parameter value that uniquely identifies the client device. For example, the time value can be the current time and the parameter value can be serial number of the client device; in step 102, the code is delivered from the management device to the client device. Many ways of delivering could be used, e.g. by telephone, by email, or by the message that the management device uses for signal communication with the client device; in step 103, the client device restores the factory configuration by using the code in a predefined period of time. Normally, the start time of the predefined period of time is determined by the time value that is used by the management device to generate the code. Moreover, for example, the predefined period of time could be set to 10 minutes or 1 hour. Please note that the method could apply to restore not only the factory configuration but also part of settings of the client device, namely, at least one setting of the client device. The following embodiments will take the factory configuration for an example for description.

Figure 2:
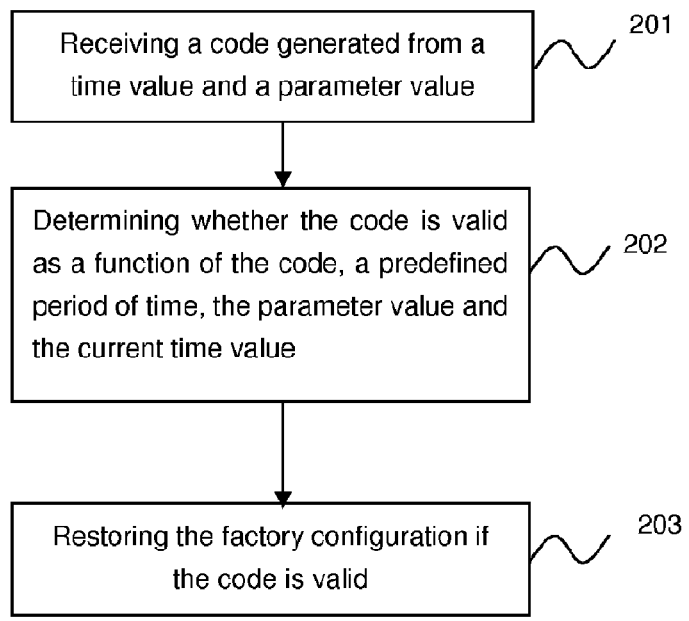
FIG. 2 is a flowchart of a method carried out by a client device in accordance with one embodiment.

As can be seen from FIG. 2 in accordance with one embodiment of the present invention, in step 201, the client device receives a code generated from a time value and a parameter value, wherein, the parameter value uniquely identifies the client device; in step 202, the client device determines whether the code is valid based on a predefined period of time, the parameter value and the current time value, herein, the predefined period of time could be stored in the client device or acknowledged by the client device through other ways, e.g. the predefined period of time is contained in a message from the management device to the client device or the predefined period of time is stored in other storage device; the start time of the predefined period of time is determined by the time value that is used by the management device to generated the code; and the current time value could be the time when the client device receives the code or when the action of determination is carried out; in step 203, the client device restores the factory configuration of the client device if the code is valid. There is also a situation, which is not the major concern of the embodiment, that the code is not valid, in that case, for one example, the client device could do nothing but display "Invalid code" or other tips alike. Furthermore, it could lock the client device after a predefined times of invalid input.

Figure 3:
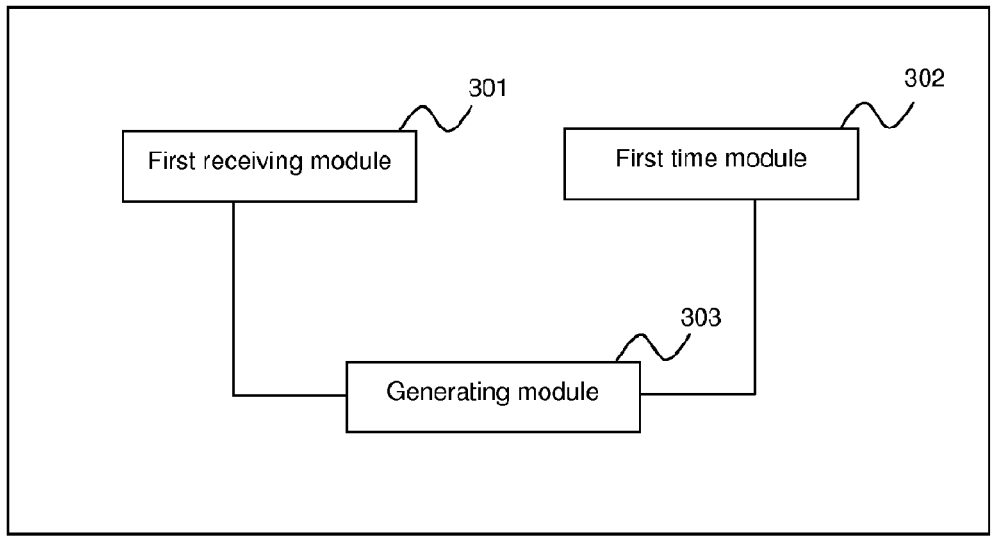
FIG. 3 illustrates a block diagram for a management device in accordance with one embodiment.

FIG. 3 illustrates block diagram for a management device in accordance with one embodiment. The management device comprises a first receiving module 301, a first time module 302 and a generating module 303. The first receiving module 301 is configured to receive various inputs, e.g. a parameter value that uniquely identifies a client device. The first time module 302 is configured to provide the time value, e.g. the current time. The generating module 303 is configured to generate a code from a time value derived from the first time module 302 and a parameter value received by the first receiving module 301. Wherein, the code is valid in a predefined period of time for the corresponding client device to restore the factory configuration, and the time value determines the start time of the predefined period of time. Please note the management device could further comprise a first display module (not shown in the diagram), which is configured to display the code, or a delivering module (not shown in the diagram) that is configured to deliver the code from the management device to the client device.

Figure 4:
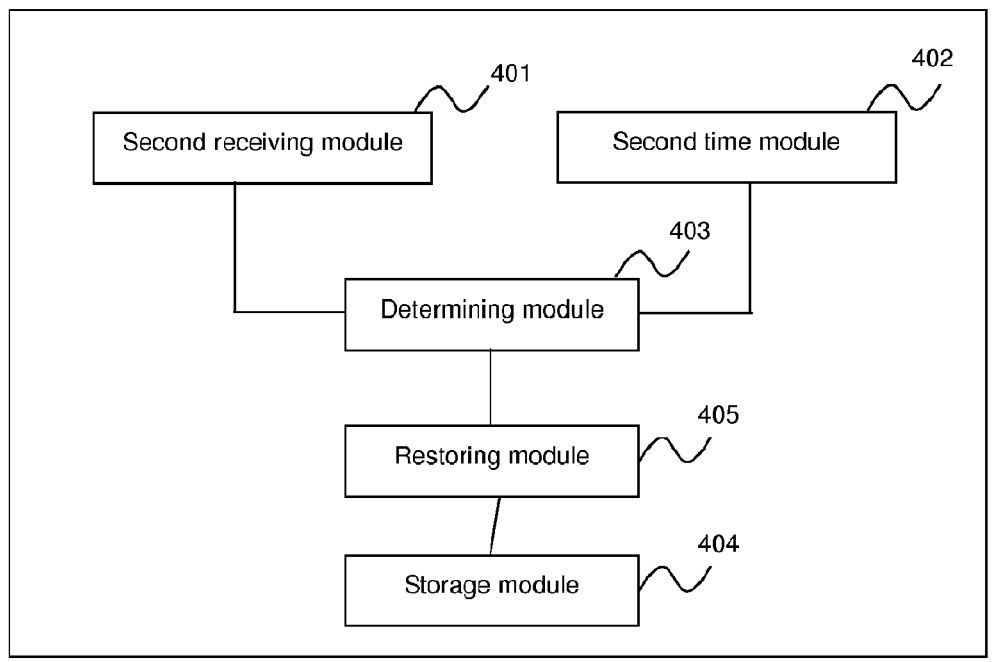
FIG. 4 illustrates a block diagram for a client device in accordance with one embodiment.

FIG. 4 illustrates block diagram for a client device in accordance with one embodiment. The client device comprises a second receiving module 401, a second time module 402, a determining module 403, a storage module 404 and a restoring module 405. The second receiving module 401 is configured to receive various inputs, e.g. a parameter value that uniquely identifies a client device and a code generated by a management device from a time value and a parameter value. The second time module 402 is configured to provide the time value, e.g. the current time. The storage module 404 is configured to store settings of the factory configuration. Normally, the storage module is a kind of none volatile memories. The restoring module 405 is configured to retrieve the settings of the factory configuration from the storage module 404 and restore the factory configuration of the client device. The determining module 403 is configured to determine the validity of the code, which is received by the second receiving module 401 and remains valid in a predefined period of time, based on the predefined period of time, a time value from the second time module 402 and a parameter value received by the second receiving module 401, herein, the time value is usually the current time value; if the code is valid, the determining module 403 will invoke the restoring module 405 to restore the factory configuration of the client device. Please note the client device could further comprise a second display module (not shown in the diagram) that is configured to display information, e.g. the output results of determining module 403. Herein, there are alternatives for the storage module 404, e.g. the restoring module 405 could retrieve settings of the factory configuration that is stored in a storage device located in a network. It is also possible that the restoring module 405 only retrieves and restores part of settings. With regard to the determination of validity, there are at least two implementation methods, the first method is to generates by the client device a list of codes based on the parameter value, the time value and the predefined period of time by using the same algorithm as the management device uses to generate the code, and then determining whether the code generated by the management device is in the list of codes generated by the client device, if in, the code is valid, otherwise, the code is invalid; the second method is to derive the time value and the parameter value from the code, and then determining whether the received parameter value is the same as the derived parameter value and whether the received time value is in the predefined period of time based on the derived time value, if the parameter values are the same and the received time value is in the predefined period of time, then the code is valid, otherwise, the code is invalid.

Normally, the first time module 302 and the second time module 402 are synchronous in time or within an acceptable difference in time. For example, the second time module 402 could regard the first time module 302 as the reference timer, or they both regard other external timer as the reference timer. Moreover, the parameter value is used as a unique identifier for the client device and the time value that is used by the management device to generate the code determines the start time of the predefined period of time. Generally, the code is generated from the time value and the parameter value, but it should be known to a person skilled in the art that it could include other information in the code, such as operator's name or operation's identifier; namely, the code could be generated from at least the time value and the parameter value.

An embodiment of a STB (Set Top Box) employing above method will be elaborated below. Firstly, the operator device gets the serial number of a STB, which uniquely identifies the STB, through a communication network. The communication network could be internet network or telephone network, to be specific, e.g. through an e-mail, through a dedicated communication protocol, or by call; secondly, the operator device generates a temporary PIN code based on the serial number and a time value, e.g. the current time when the management device receives the serial number. Herein, the temporary PIN code means a PIN code is just valid in a predefined period of time for the STB to restore its factory configuration; thirdly, the operator delivers the temporary PIN code to the STB; fourthly, the STB checks the validity of the temporary PIN code, if the temporary PIN code is valid, the STB restores its factory configuration, otherwise, the STB, for example, displays the tip of "Invalidity".

According to one embodiment of the present invention, it provides an algorithm for the management device to generate the code based on at least a time value and a parameter value. Taking STB for an example, in this embodiment, further information of operator's identifier is included. Firstly, a string is generated based on the serial number of the SIB and the current time, of course, it could also further includes the operator's identifier for other purpose; secondly, get 16 bytes MD5 result by inputting the string into an MD5 algorithm; thirdly, adding the high 4 bits to the low 4 bits and then modulo 10 for each byte of the 16 bytes MD5 result. Through this step of operation, 16 numbers ranging from 0 to 9 are generated; fourthly, adding 0x30 for each number so that we could get 16 readable ASCII numbers which are easy to convey by talking on telephone. Please note that other alternative algorithms are possible so long as it includes the information of the time value and the serial number. Please also note that there are alternatives of the ways for transmitting the code, e.g. through a dedicated communication protocol.

Figure 5:
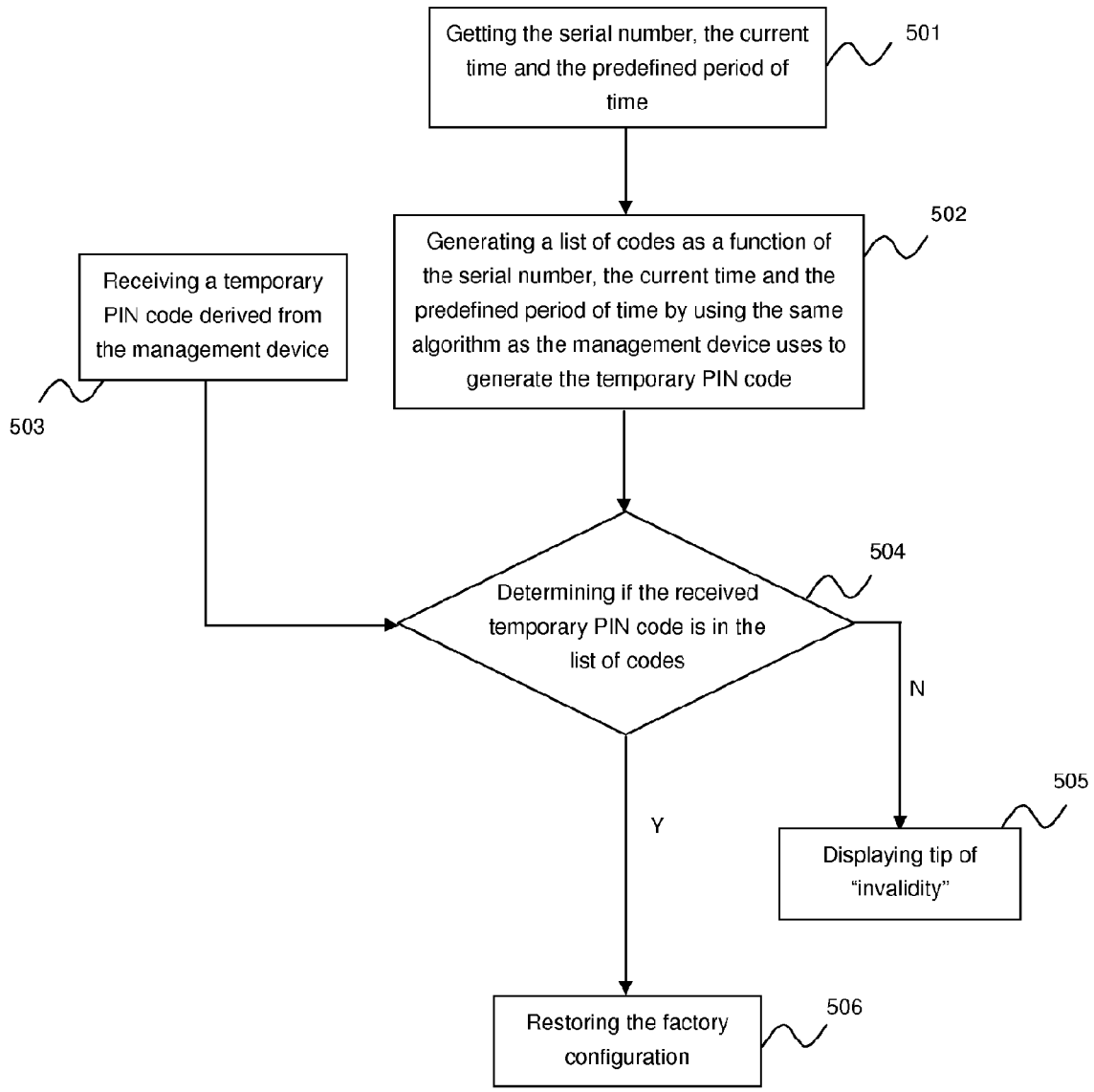
FIG. 5 is a flowchart of a detailed method for restoring the factory configuration carried out by the STB in accordance with one embodiment.

According to one embodiment of the present invention, it provides an example of steps performed by the STB to restore the factory configuration. As shown in FIG. 5, in step 501, the STB gets the serial number, the current time and the predefined period of time, herein, the predefined period of time could be stored in the STB, the serial number could be stored in the STB or inputted manually, and the current time is derived from a reference timer that is also referred by the management device; in step 502, the STB generates a list of codes based on the serial number, the current time and the predefined period of time by using the same algorithm as the management device uses to generate the temporary PIN code. Herein, one example for generating the list is firstly generating a list of time values based on the current time and the predefined period of time and then generating the list of codes based on pairs of each time value and the serial number; in step 503, the STB receives a temporary PIN code from the management device; in step 504, the STB determines if the received temporary PIN code is in the list of codes obtained in step 502; if the received temporary PIN code is in the list of codes, so in step 506, the STB restores the factory configuration, if not, in step 505, the STB displays a tip of "Invalidity". Please note the step 505 is not indispensable.

According to one embodiment of the present invention, it provides a code for restoring the factory configuration of a client device. The code, which is valid for restoring the factory configuration of the corresponding client device in a predefined period of time, is generated by a management device based on a time value and a parameter value that uniquely identifies a client device. Herein, the time value determines the start time of the predefined period of time.

By using the code generated from a time value and a parameter value, the operator needn't send an engineer to user's home, thus it could save its operational cost. Furthermore, by using the time value and the predefined period of time, the code is invalid out of the predefined period of time whose start time is determined by the time value that is used to generate the code; and by using the parameter value that uniquely identifies the client device, each client device could has its own code, thus, it is convenient for the code management and reduce the chance of exposing the client device to danger.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention.

The invention claimed is:

1. A method for restoring at least one setting of a selected client device, having a parameter value that uniquely identifies itself, among at least one client device, comprising the steps of:
   receiving by said selected client device a code, which is generated by a management device based on a time value and the parameter value uniquely identifying said client device;
   determining by said selected client device whether said code is valid by generating a list of codes using a same algorithm as was used for code generation based on a predefined period of time, said parameter value of said selected client device and a current time value, wherein a starting time of said predefined period of time is determined by the current time value, and determining whether said code received by said client device is in said list of codes; and
   restoring by said selected client device said at least one setting of said selected client device if said code is valid.

2. The method according to claim 1, wherein said code comprising the information of said time value and said parameter value is a message initially sent by said management device.

3. The method according to claim 1, wherein said time value and said current time value are derived from the same timer, or timers that are synchronous, or timers within an acceptable difference.

4. The method according to claim 1, wherein the step of generating the code further comprises:
   generating a string based on the time value and the parameter value;
   applying an MD5 algorithm on the string to generate a 16-byte MD5 result;
   for each byte of the 16-byte MD5 result, adding said byte's high 4 bits to said byte's low 4 bits and then dividing modulo 10 to produce 16 numbers; and
   adding 0x30 for each of the 16 numbers.

5. A client device for restoring at least one setting among at least one client device, comprising:
   a receiving module;
   a time module configured to provide a time value;
   a restoring module configured to retrieve and restore said at least one setting of said client device; and
   a determining module configured to determine the validity of a code received by said receiving module by generating a list of codes using a same algorithm as was used for code generation based on a time value derived from said time module, a parameter value uniquely identifying said client device, and a predefined period of time, and determining whether said code received by said client device is in said list of codes; and also configured to invoke said restoring module if determining said code is valid,
   wherein said code is generated by a management device based on a time value that determines a starting time of said predefined period of time and a parameter value that uniquely identifies the client device.

6. The client device according to claim 5, wherein it further comprises: a storage module configured to store said at least one setting of said client device.

7. The client device according to claim 5, wherein the determination carried out by said determining module further comprises: said determining module generates a list of codes based on said predefined period of time, said parameter value and said current time value; and said determining module determines whether said code received by said receiving module is in said list of codes.

8. A management device for restoring at least one setting of a client device among at least one client device comprising:
   a receiving module;
   a time module configured to provide a time value; and
   a generation module configured to generate a code based on a time value derived from said time module and a parameter value, which uniquely identifies said client device and is received by said receiving module, wherein said code is valid for said client device to restore said at least one setting in a predefined period of time and wherein a starting time of said predefined period of time is determined by said time value,
   wherein the code is determined as being valid by said client device if the code is included in a list of codes generated by the client device using a same algorithm as was used for code generation, based on said predefined period of time, said parameter value of said client device, and a current time value.

9. The management device according to claim 8, wherein the generation module is further configured to generate a code by:
   generating a string based on the time value and the parameter value;
   applying an MD5 algorithm on the string to generate a 16-byte MD5 result;
   for each byte of the 16-byte MD5 result, adding said byte's high 4 bits to said byte's low 4 bits and then dividing modulo 10 to produce 16 numbers; and
   adding 0x30 for each of the 16 numbers.

* * * * *